Jan. 13, 1970

A. C. MARTIN 3,489,227

ROTARY WEEDER OR CULTIVATOR APPARATUS

Filed April 6, 1967

INVENTOR.
ALMA C. MARTIN
BY

*Victor J. Evans & Co.*
ATTORNEYS

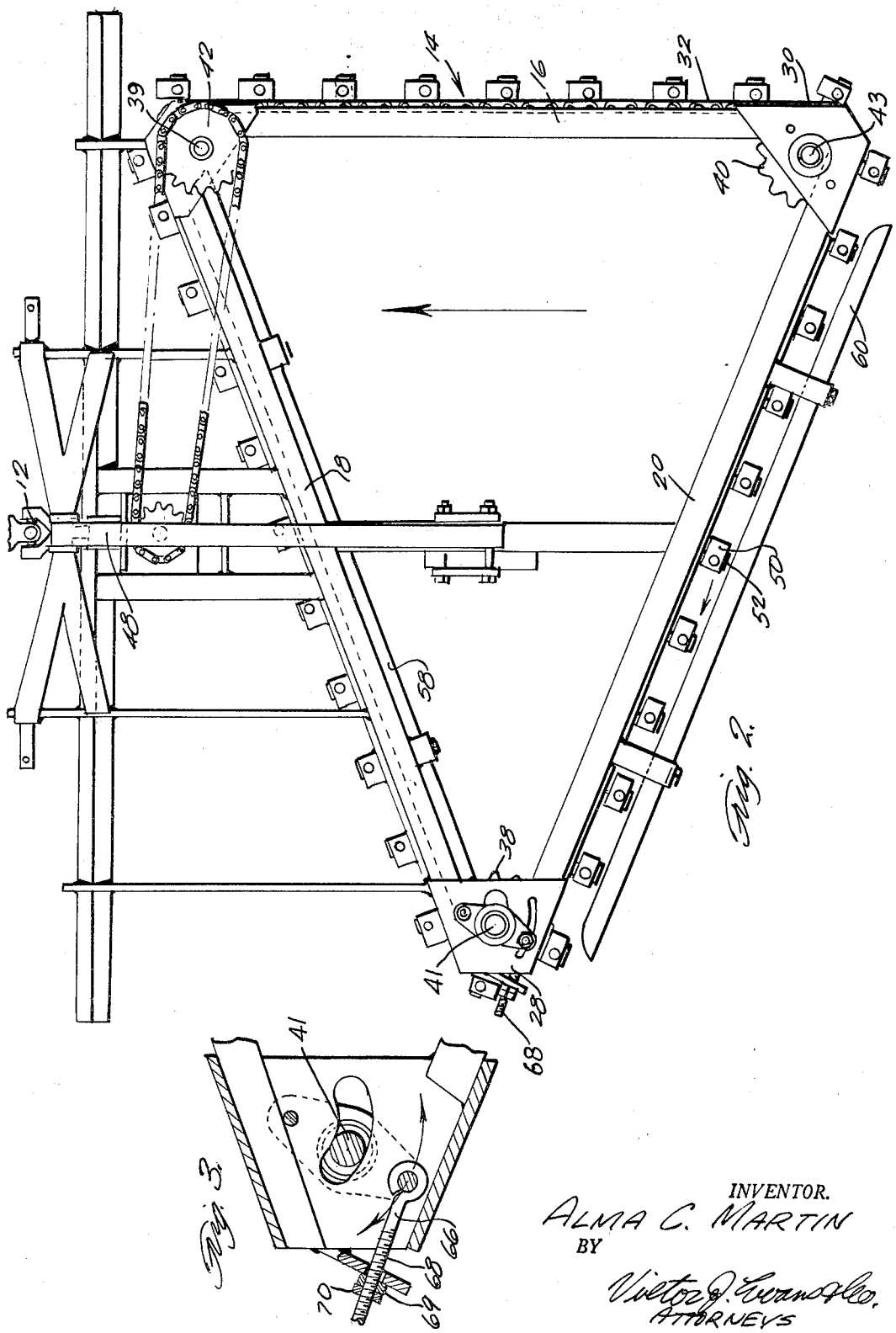

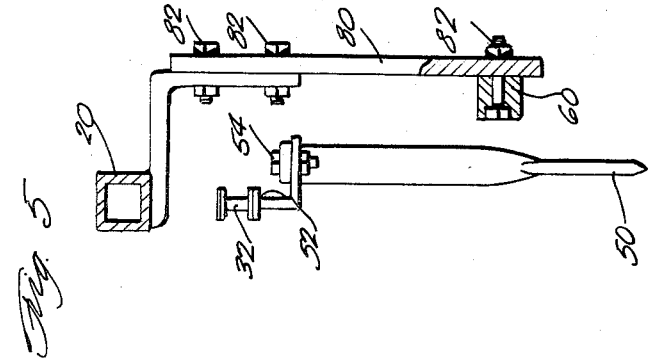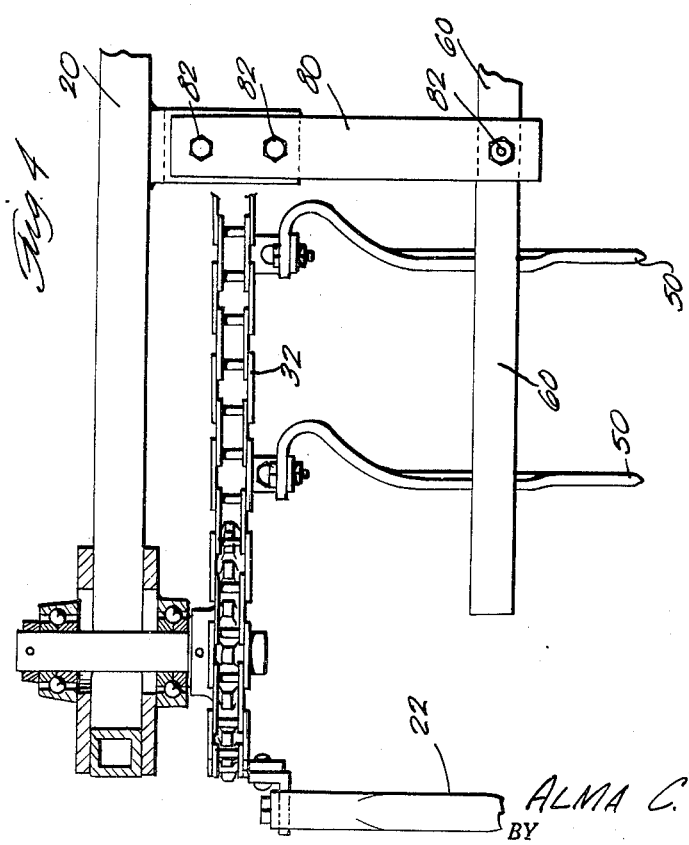

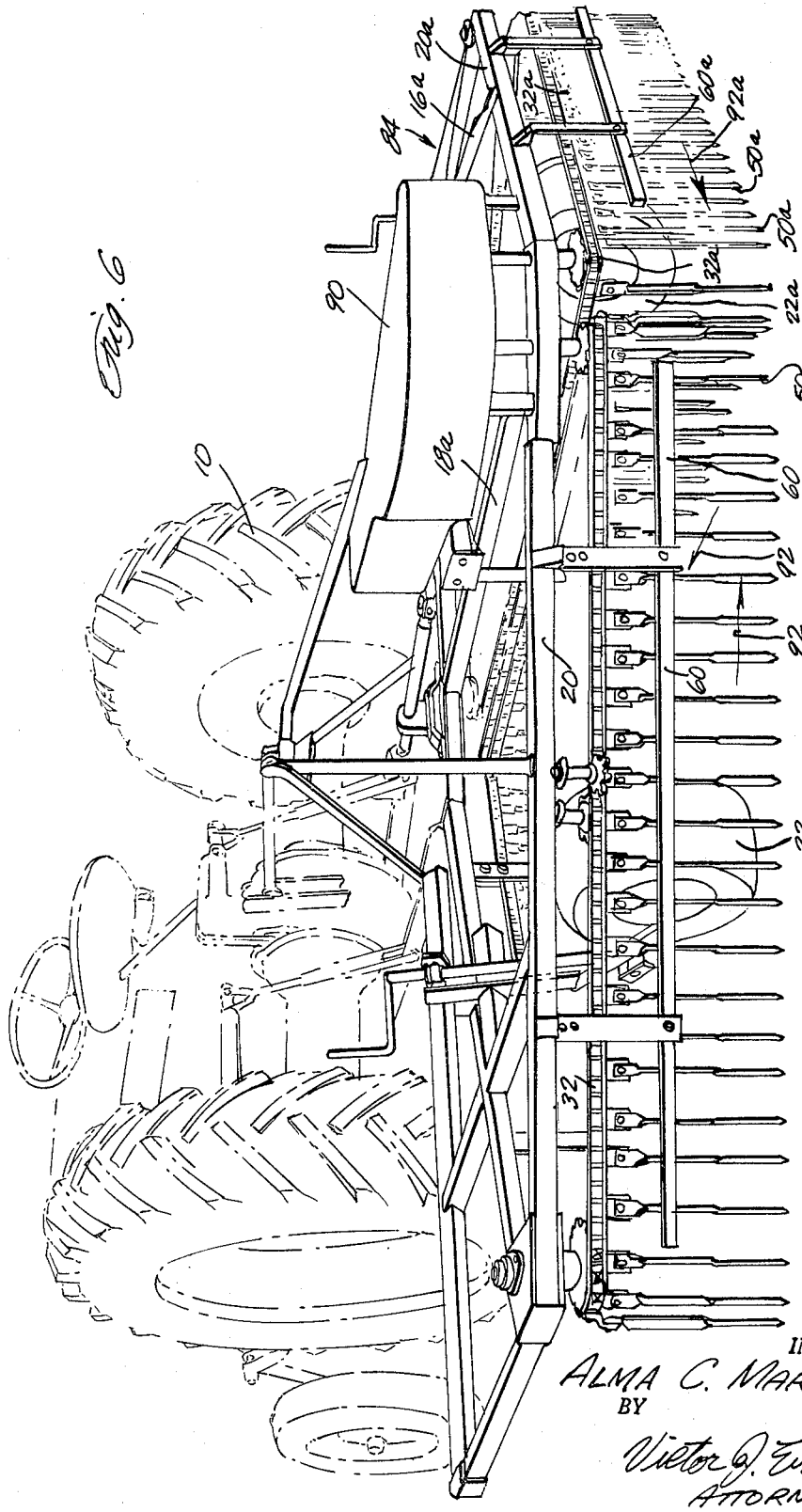

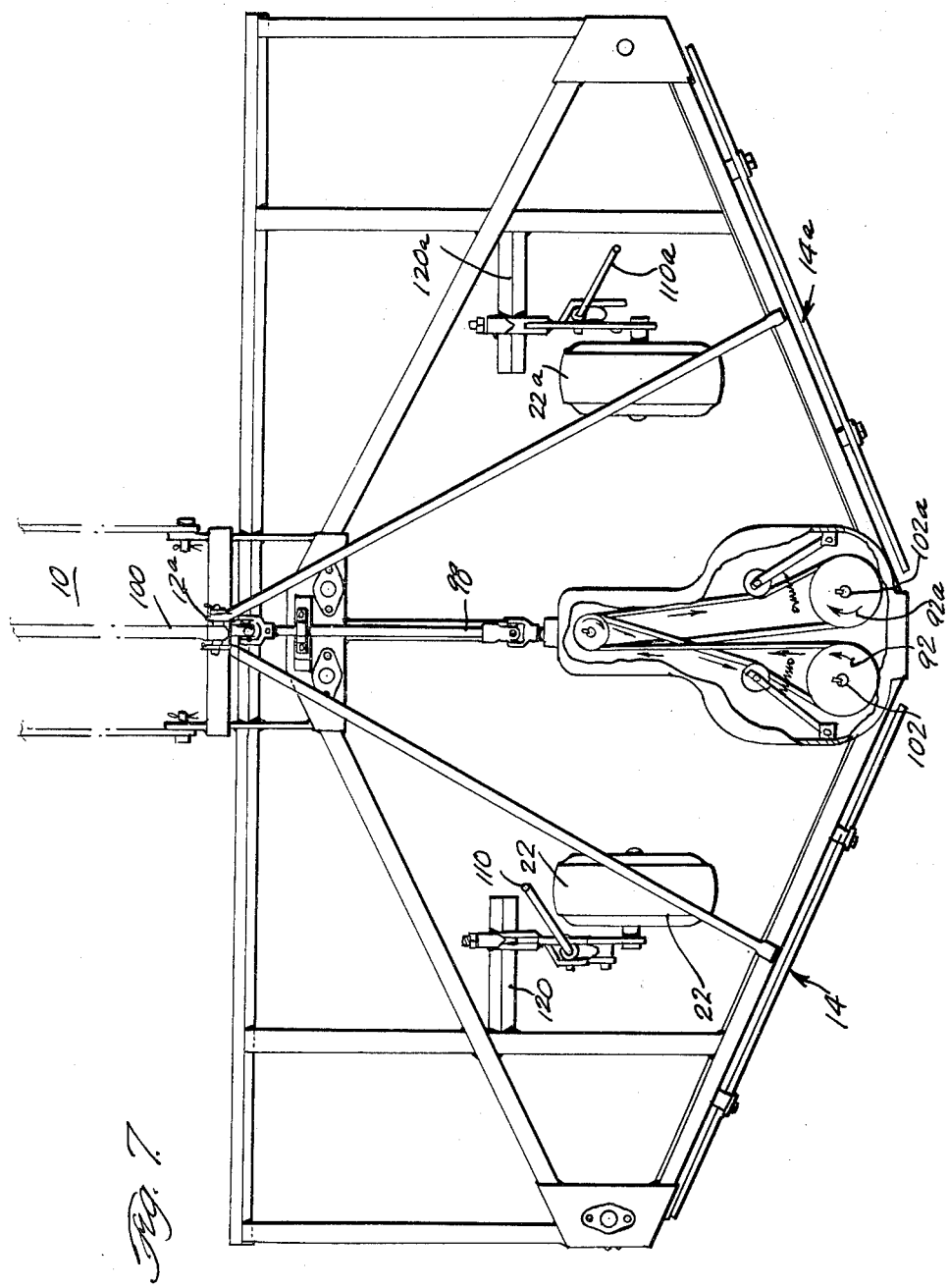

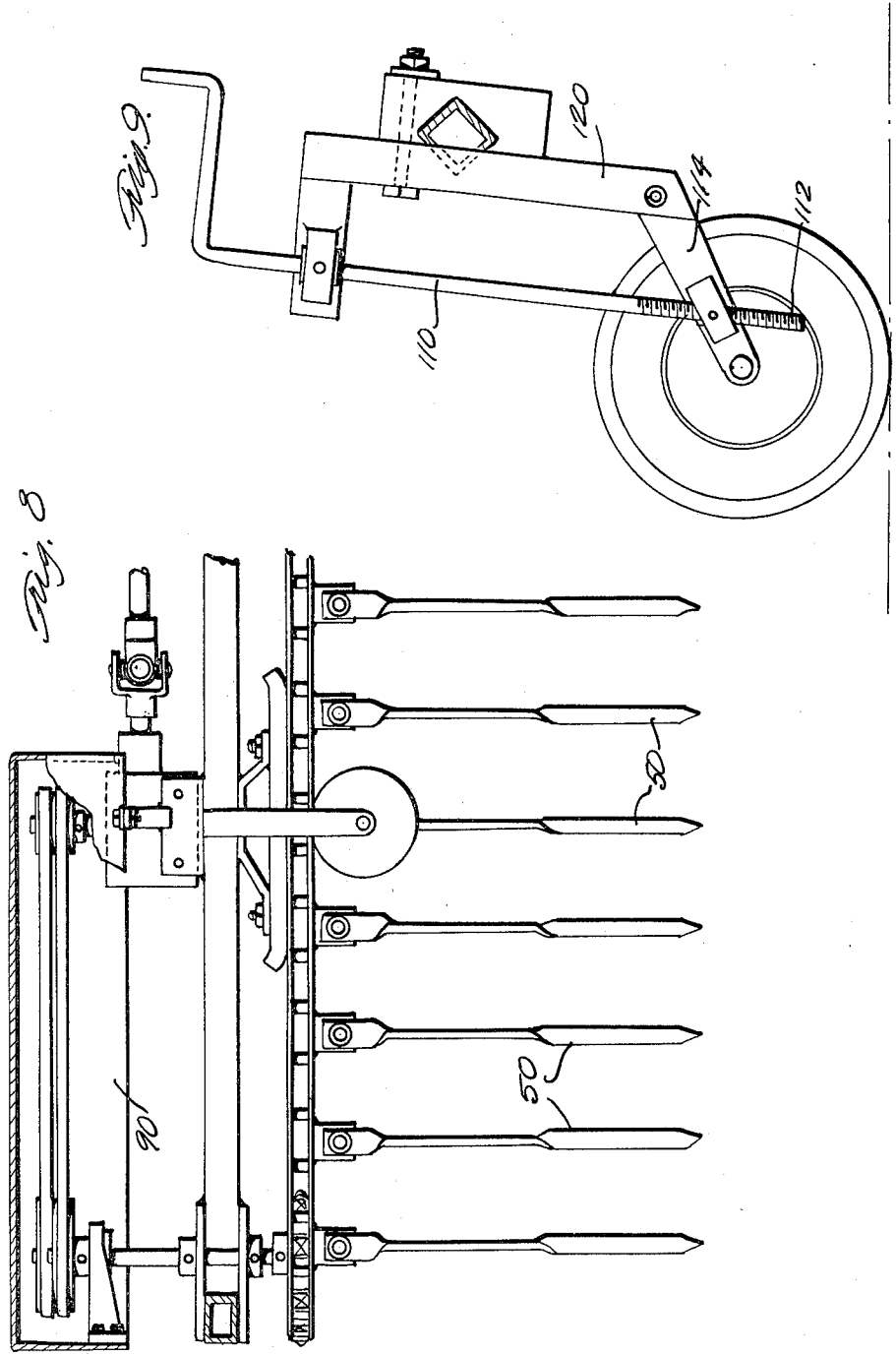

United States Patent Office 3,489,227
Patented Jan. 13, 1970

3,489,227
ROTARY WEEDER OR CULTIVATOR
APPARATUS
Alma C. Martin, Pendleton, N.C. 27862
Filed Apr. 6, 1967, Ser. No. 628,927
Int. Cl. A01b 33/00
U.S. Cl. 172—100     3 Claims

ABSTRACT OF THE DISCLOSURE

Rotary weeder or cultivator apparatus in which crops are cultivated not only down the furrows but also between the growing plants thereof. A triangular frame structure is employed so that as the device is towed by the tractor, it will be noted that the cultivator elements are virtually operating in a square configuration. Thus as the triangular frame is moved progressively forward, a square area is seen to be cultivated, and this is accomplished by guards mounted on an endless drive mechanism upon the frame designed to maintain the cultivator elements in a substantially true vertical position for use and as such all of the cultivator elements will have equal penetration into the engaging soil.

---

Therefore it is seen that the invention relates to rotary weeder or cultivator devices to cultivate crops between the growing plants of cultivated furrows so that a square area is seen to be tilted for cultivation.

An object therefore of the invention is to provide triangular frame cultivating apparatus that when moved progressively forward, a square area is seen to be tilled for cultivation. Guards for the cultivating apparatus are mounted upon the frame and designed to maintain the cultivator elements in a true vertical position in use so that the cultivator elements will have equal and continual penetration into the engaging soil.

The above and other objects and advantages of the invention will become apparent upon full consideration of the following detailed description and accompanying drawings in which:

FIG. 2 is a plan view thereof;

FIG. 3 shows the details on an enlarged scale of adjustment means shown in FIG. 2;

FIG. 4 shows a detailed and enlarged elevation view of the guard and cultivating elements of the apparatus;

FIG. 5 shows a side or cross-sectional view thereof;

FIG. 6 shows a generally left rearward quarter perspective view in which a pair of triangular frames are mounted to be drawn by a tractor;

FIG. 7 shows a generally plan view thereof and the manner in which the cultivator elements are operated in driving relation by shaft coupling means to the tractor;

FIG. 8 shows a detailed and enlarged view of the driving means of FIG. 7; and

FIG. 9 shows a side view in broken-away section of height adjusting means for the triangular frame.

Figure 1:
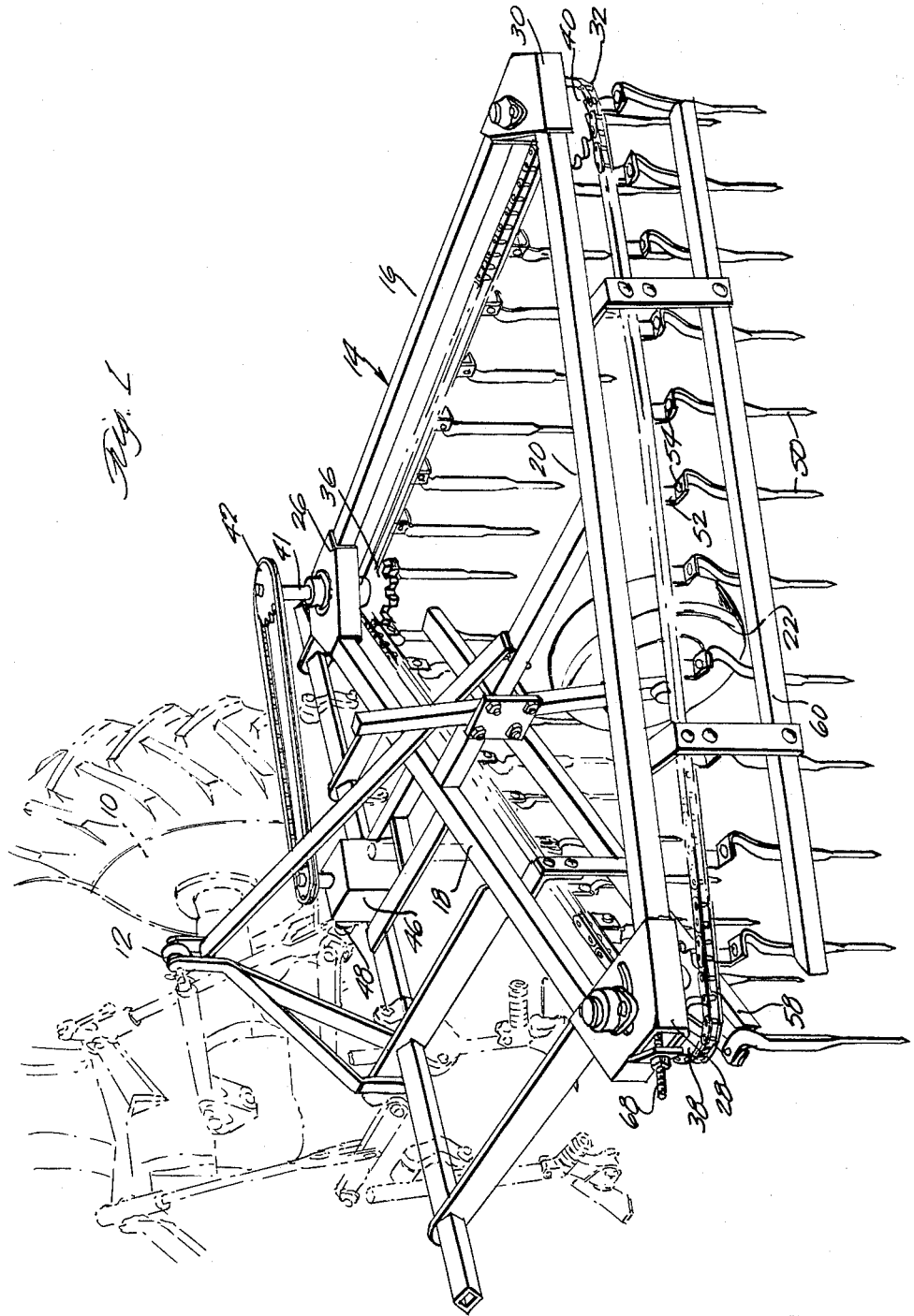
FIG. 1 is a generally left rearward quarter perspective view in part of the rotary weeder or cultivator apparatus.

Referring now to the drawings, there is shown a farm tractor 10 having a hitch means 12 to couple or connect a generally triangular frame 14 having side members 16, 18, 20, and having wheel mounting means 22.

The frame 14 has its members 16, 18, 20 connected by adjustable connecting means 26, 28, 30 so that an endless chain 32 is adapted to pass over sprockets 36, 38, 40, which are mounted respectively on shafts 39, 41, 43. A driving sprocket 42 is coupled by the shaft 41 to the sprocket 36 and as the driving sprocket 42 is driven by driving means 46 in response to shaft rotation of coupling means 48 from the tractor, the endless chain 32 is seen to move endlessly about its path over the sprockets 36, 38, 40.

Along the length of the endless chain is a plurality of cultivator elements 50 for engaging the soil, the cultivating elements 50, 50 being pivotally or rivetally suspended from an L-shaped support member 52, coupled in depending relation to the chain 32. The cultivator element 50 is engaged to the L-shaped member 52 by rivet means 54.

In depending relation to the triangular frame 14 and in general parallel relation to the members 18, 20 are guard members 58, 60 disposed in parallel relation to members 18, 20. The guard means 58, 60 are seen to urge the cultivating elements 50, 50 into the soil due to the forward movement of the triangular frame 14 as drawn by the tractor, the transverse direction of the cultivator elements 50 as it passes along the guard means 58, 60, and due to the urging effect of the guard means to maintain the cultivator elements in a generally vertical position and relation due to the L-shaped and rivet construction 52, 54 together with the cooperative mechanical results obtained by the guard means 58, 60. In this way, the triangular frame mounting the cultivator elements 50 being moved progressively forward causes a generally square or rectangular area to be cultivated, the rectangular area having at least two sides thereof parallel to either member 18 or member 20. The guards on the frame are designed to maintain the cultivator elements in a substantially and effective vertical relation or position while in use and this is achieved, as described above, due to the effect of the guard means 58, 60 and the L-shaped construction of member 52 with the pivot relation 54, so that the cultivator elements will have substantially and effectively equal penetration into the engaging soil.

FIG. 3 shows the manner in which the members 18, 20 may be adjusted to provide the necessary taut effect on the endless chain 32, and include adjusting means 66 which is a threaded member 68 having a nut 69 and a lock nut 70 disposed thereon. Also shown is a shaft 41 for mounting a sprocket wheel 38 for the chain 32.

FIG. 4 shows the element 20 of the triangular frame 14 and the guide member 60 supported in detail by the structural L-shaped bracket 80 having bolts 82 therein.

FIG. 5 shows particularly the details of the bracket 80 together with the support arrangement for the cultivating element 50 with relation to its mounted arrangement with the endless chain 32.

FIG. 6 shows the arrangement in which a pair of back-to-back triangular frames are disposed, the one on the left being essentially that of FIG. 1 and the one on the right constituting the triangular frame 84 having triangular members 16a, 18a, 20a, and having guard member 60a. It is seen that 60a corresponds with 60 and other reference numerals are identified with the triangular frame structure mated thereto by the addition or deletion of the added reference letter a, and depending on whether the left or the right structure is intended to be identified. Also shown in FIG. 6 is a composite driving means for each of the endless belts 32, 32a, driven by the driving means 90 so that along the mutual back-to-back or mating portion the cultivating elements 50, 50, 50a, 50a are driven in a common direction, as shown by arrows 92, 92a.

The details of the driving means 90 are illustrated in FIG. 7 so that substantial tension is continually applied to the mechanisms of the driving means, and a common driving coupling 98 is used to engage the driving means 90 to the shaft 100 of the tractor through the hitch means 12a.

In the paired triangular frame arrangement the endless chain is driven from the rear sprocket means on shaft 102, 102a, and the paired triangular frames 14, 14a are mounted by a pair of adustably mounted wheels 22, 22a. As is shown in FIG. 9, the height of the cultivating elements is adjusted by the position of the crank arm 110, 110a when the threaded end 112 engages a link arm 114 supported from the triangular frame 14 by support leg 120, as shown.

What is claimed is:

1. A rotary weeder or cultivator apparatus comprising three arms forming a generally triangular horizontal frame wheel being mounted to be pulled by a tractor, an endless chain mounted to be driven around said triangular frame, said chain having depending extensions for pivotally mounting cultivator elements hanging therefrom, a guard rail extending in parallel relation to at least two arms of said triangular frame and driving means for coupling to said tractor to drive said endless chain for cultivating the engaging soil forming furrows around plants.

2. The invention according to claim 1 wherein a pair of triangular horizontal frames arranged in back-to-back relation are cooperatively disposed to be pulled by said tractor, and in which said driving means drive the respective endless chains in a common direction along said back-to-back portion.

3. The invention according to claim 2 wherein the wheel mounting means are adjusted in height to control the general penetration effect of the cultivator elements.

References Cited

UNITED STATES PATENTS

| | | | |
|---|---|---|---|
| 532,079 | 1/1895 | Mathwich | 56—376 |
| 908,874 | 1/1909 | Lochtin | 172—100 X |
| 1,151,888 | 8/1915 | Lundgren | 172—419 |
| 1,335,212 | 3/1920 | Wallace | 172—100 |

ROBERT E. PULFREY, Primary Examiner

W. J. CONLON, Assistant Examiner

U.S. Cl. X.R.

172—523, 542